United States Patent [19]

Newcomer

[11] 3,762,394
[45] Oct. 2, 1973

[54] ELIMINATION OF COOKING ODORS
[75] Inventor: J. L. Newcomer, Trotwood, Ohio
[73] Assignee: Food Technology Inc., Dayton, Ohio
[22] Filed: Sept. 8, 1971
[21] Appl. No.: 178,629

[52] U.S. Cl. .................... 126/300, 99/330, 99/403
[51] Int. Cl. ............................................ F24c 15/20
[58] Field of Search ......................... 126/299, 300; 98/115; 99/403, 404, 406, 408, 330

[56] References Cited
UNITED STATES PATENTS
| 906,375 | 12/1908 | Bowser | 126/300 |
| 3,221,635 | 12/1965 | Hill | 98/115 K |
| 2,392,038 | 1/1946 | Gaylord | 126/299 B |
| 3,376,806 | 4/1968 | Magnusson | 99/408 |

*Primary Examiner*—Edward G. Favors
*Attorney*—Lawrence B. Biebel et al.

[57] ABSTRACT

Cooking odors generated by the deep fat frying of potato chips or other food products are eliminated by directing the fumes back to the burner heating the cooking oil for incineration thereof. The flow of the fumes from the cooking process can be controlled to maintain the quantity of fumes no more than the amount of combustion air needed by the burner to insure that all of the fumes are incinerated. Additionally, condensers may be utilized to remove a substantial portion of the moisture carried by the fumes before they are incinerated.

19 Claims, 1 Drawing Figure

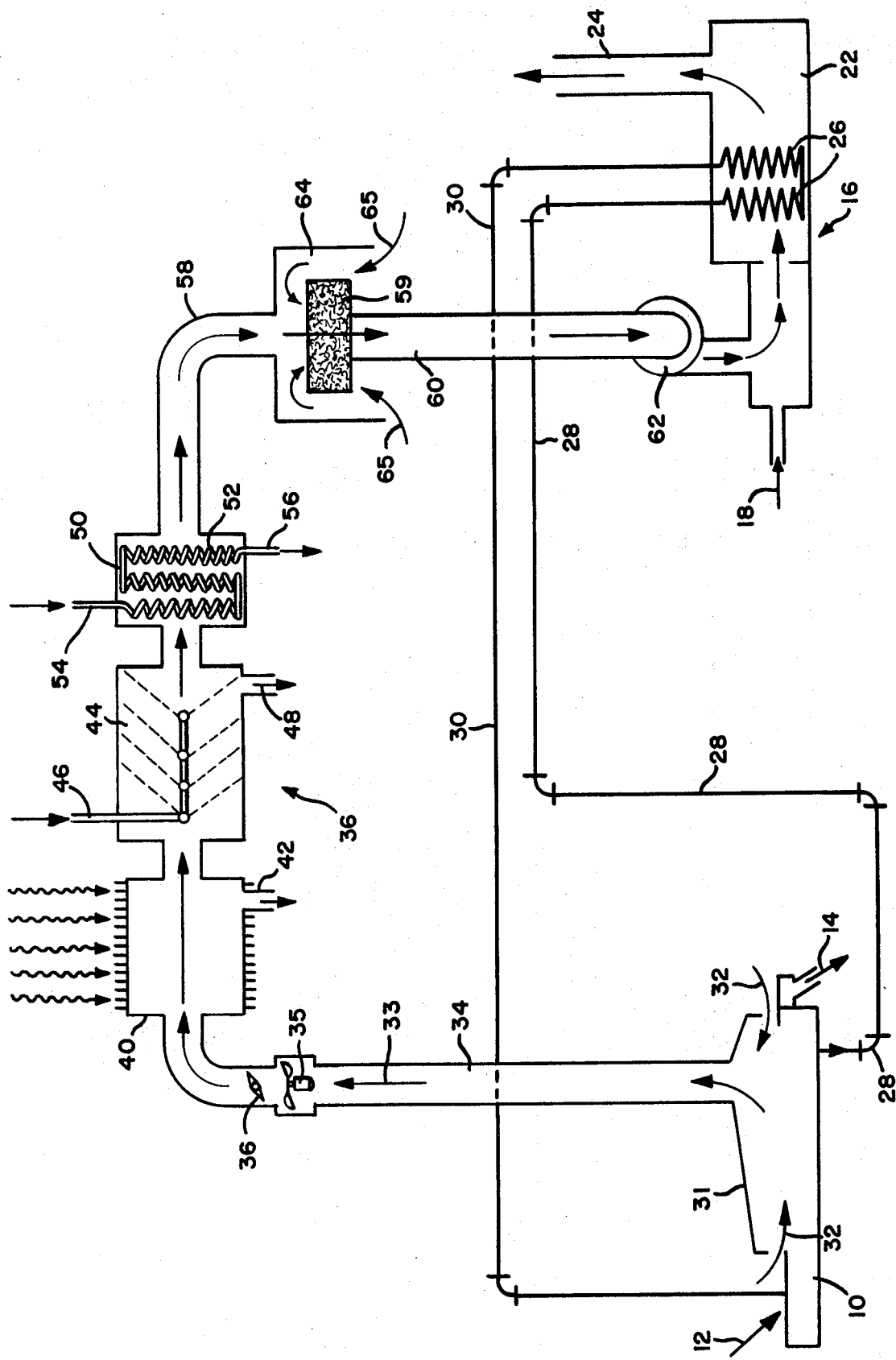

ELIMINATION OF COOKING ODORS

BACKGROUND OF THE INVENTION

In the processing of certain products, such as in the cooking of food products, waste materials are generated which may, for one reason or another, be undesirable to release without further treatment. For example, in the production of potato chips and other similar food products thin slices of raw potatoes are deposited in hot cooking oils at temperatures of approximately 230°F. for a sufficient length of time to reduce the moisture contained in and on the potato slices from approximately 85 percent by weight to approximately 2 percent by weight.

The cooking oil is heated in a heat exchanger, which consists of cooking oil circulating tubes heated by exposure to hot furnace gases generated by some type of burner, such as a gas or oil fired furnace. The hot cooking oils are circulated to the cooking vat and the cooled oils are returned to the heat exchanger for further heating. Combustion air is force fed to the furnace while a hood is provided over the frying vat to collect the mixture of steam and hot gases emitted from the vat during the cooking process.

Despite the fact that this mixture will have a typical frying odor, which may be considered objectionable, and will also contain a certain amount of entrained oil particles, conventional practice is to vent the mixture collected in the hood to the atmosphere untreated. While this is obviosly undesirable and, in view of more stringent air pollution control laws recently enacted in many locales, may in fact be unpermissible in some locations, the alternatives heretofore available have been too expensive to win acceptance by the industry.

In this regard some of the approaches which have received consideration have been the provision of a special furnace or afterburner for incinerating the discharge from the fryer vat, adsorption by activated charcoal, masking with a covering odor and chemical neutralization. With regard to incineration, the provision of an afterburner and the fuel necessary to consume the gases produced is believed prohibitably expensive, as is the use of activated charcoal, which must be periodically regenerated and replaced. Masking and neutralization of the odors generated of course, deals only with a portion of the problem and even in this limited aspect appears impractical within current technology.

SUMMARY OF THE INVENTION

In accordance with the present invention the hot gases generated during the cooking process and entrained air are collected and directed into the furnace heating the cooking oils for incineration thereby. Thus, the undesirable gaseous products produced during the cooking process are disposed of by being utilized by the furnace which is heating the cooking oils.

Preferably, the amount of gases directed to the furnace is controlled to maintain the volume of such gases no more than the amount required to support combustion. In this way all of the fumes are eliminated by incineration.

In accordance with another feature of the invention the gases, before being directed to the furnace, are passed through a condensing and cooling section to remove moisture and oil particles carried by the moisture. This both improves the quality of the gases for combustion purposes and reduces corrosion of the furnace components.

Thus, as will be apparent from the detailed description below, the present invention provides means for eliminating undesirable odors generated during the cooking process without the necessity of extensive additional equipment, fuel and maintenance.

BRIEF DESCRIPTION OF THE DRAWINGS

The drawing shows, somewhat schematically, the process and apparatus of the present invention.

DESCRIPTION OF THE PREFERRED EMBODIMENTS

As seen in the drawing, apparatus in accordance with the present invention may include a vat 10 containing a supply of hot cooking oil and into which the food products, such as raw potato slices, may be deposited adjacent one end, as indicated by the arrow 12 and removed, after sufficient cooking, at the opposite end as indicated by the arrow 14. Generally, the raw potato slices will contain approximately 85 percent moisture by weight, and cooking in the hot oil, which is maintained at approximately 230°F., will reduce the moisture content of the slices to approximately 2 percent by weight.

In order to maintain the temperature of the cooking oil at the desired level a heat exchanger 16 is provided which may be fired by gas, oil or any suitable fuel. In using a combustible gas, such as natural gas, for example, such gas may be admitted, as indicated by the arrow 18, to the mixing chamber 20 for mixture with combustion air and then passed into the combustion chamber 22, with normal combustion products vented from chamber 22 through the stack 24.

The heat exchanger 16 may be of conventional construction, including heat exchanging coils 26 connected at their intake end to a line 28 and at their outlet end to a line 30. As will be apparent from the Figure, oil is withdrawn from the cooking vat 10 through the line 28, circulated through the coils 26, where the hot combustion gases pass thereover, and returned to the cooking vat 10 through the line 30. In this way and with suitable control mechanism which may be of conventional construction and is not shown for purposes of simplification, the temperature of the cooking oil in the vat may be maintained at the desired level. While the furnace is shown, for purposes of illustration, as positioned remote from the vat, it will be apparent that the two may be positioned adjacent each other or incorporated in a single unit.

A hood 31 is positioned over the vat 10 and collects the mixture of steam and hot, odor laden gases which are normally emitted from the surface of the cooking oil during the cooking process. The hood is open at each end of the vat, usually just enough to permit the potato slices to be deposited in the vat and the finished product removed at the opposite end. Entrained air, indicated by the arrows 32, will pass into the hood to mix with the steam and odor laden gases and the resulting mixture, indicated by the arrow 33, will pass from the hood through the duct 34. A fan 35 is mounted in duct 34 and together with damper 36 provides control over the amount of entrained air drawn into the system and hence, the amount of gases delivered to the furnace or heat exchanger 16.

Preferably, before being delivered to heat exchanger 16, the mixture of gases is passed through a cooling and condensing section 36. Thus the mixture is conveyed to a condenser 40, which may conveniently be of the air cooled type, although, as will be explained presently, may also be cooled by flowing water thereover. In any case a portion of the moisture carried by the mixture 33 is removed therefrom and flows from the condenser 40 as indicated by the arrow 42. From the condenser 40 the mixture is conveyed to the condenser or scrubber 44, which is serially connected thereto and which may be of the water spray or jet type, falling water film type, or any other type for intimately mixing the steam to be condensed with the condensing water.

Thus, the condensing water may be fed to the condenser 44 as at 46 and the condensing water and condensate removed from the condenser 44 at 48. From the condenser 44 the mixture, which is now composed of relatively dry but odor laden air substantially free of oil particles, may then be conveyed to a cooler 50 containing coils 52 through which a cooling medium, such as water, may be circulated.

It will be noted that, if desired, the efficient use of water in the system can be improved if it is first introduced at point 54 in the cooler 50 with the discharge from the cooler, as at 56, being directed to the condenser 44 for introduction at 46 and the mixture of condensate and cooling water removed from the condenser 44 at 48, sprayed over the condenser 40 so that this condenser then operates as an evaporative cooler type unit to further improve its condensing capacity. Additionally, the water from the cooling and condensing section may be utilized as a source of hot water for the plant in which the cooker operates. Also, the particular order of condensers and cooler may be varied to suit the needs of a particular installation.

From the cooler 50 the dried, cooled, odor laden air is directed by means of a duct 58, filter 59, duct and a fan 62 to the heat exchanger 16, where the odor laden air is incinerated as combustion air for the burner 20.

It will be seen that the downstream end of duct 58 is enlarged, as at 64, and extends about filter 59 in spaced realtionship thereto. As noted above, the amount of gases delivered to heat exchanger 16 is preferably maintained, by controlling the amount of entrained air passing into the system, at or below the amount of combustion air required by heat exchanger 16. Therefore, if additional air is needed for combustion it may be drawn into the duct 60 through the filter 59 by passing through the space between filter 59 and enlargement, as indicated by the arrows 65. Of course, if for some reason an excess of air is delivered to duct 60, the excess may pass from the system in a flow opposite to that shown by arrows 65.

In any case, the steam and oil particles carried by the mixture passing up the stack 38 may be removed by the serially interconnected condensers 40 and 44 and the odor laden gas remaining then incinerated by the same burner used to heat the cooking oils for the vat 10. As a result, the possibly offensive odors emanating from the process are eliminated without the necessity of a separate, specially constructed burner and the expense of separate burner maintenance and fuel consumption.

While the methods herein described, and the forms of apparatus for carrying these methods into effect, constitute preferred embodiments of the invention, it is to be understood that the invention is not limited to these precise methods and forms of apparatus, and that changes may be made in either without departing from the scope of the invention which is defined in the appended claims.

What is claimed is:

1. In cooking apparatus including means for cooking a product having a relatively high moisture content in excess of 50 percent by weight and combustion means for supplying heat to said cooking means whereby an appreciable portion of the moisture of the product being cooked is released therefrom during cooking and passes from said cooking means in a mixture with odor laden fumes produced by said cooking, the improvement comprising:
   a. means for collecting the mixture of moisture and odor laden fumes generated by said cooking apparatus as a product is cooked thereby together with ambient air entrained therewith,
   b. means positioned downstream of said collecting means for removing a substantial portion of said moisture from said fumes whereby a relatively dry, odor laden mass of fumes is produced, and
   c. means for directing said relatively dry, odor laden fumes to said combustion means for incineration thereof by said combustion means to supply heat to said cooking means while simultaneously disposing of said odor laden fumes.

2. The apparatus of claim 1 further comprising:
   a. means for maintaining the volume of said mixture no greater than the volume necessary to support combustion in said combustion means.

3. The apparatus of claim 1 further comprising:
   a. means for supplying additional combustion air to said combustion means.

4. The apparatus of claim 1 wherein:
   a. said moisture removing means comprises condenser means.

5. The apparatus of claim 4 wherein:
   a. said condensor means comprises a plurality of serially related condensers.

6. Cooking apparatus comprising:
   a. a cooking vat for deep fat frying a food product,
   b. a burner for heating frying fat for said vat,
   c. means for circulating frying fat between said vat and said burner,
   d. a collection hood overlying said vat and collecting a mixture of moisture and odor laden fumes emanating from said vat and ambient air entrained therewith,
   e. a first condenser communicating with and receiving from said hood said mixture collected thereby,
   f. a second water cooled condenser communicating with said first condenser and receiving said mixture therefrom,
   g. a cooler communicating with said second condensor and receiving said mixture therefrom,
   h. means for introducing cooling water to said cooler,
   i. means for conveying cooling water from said cooler to said second condenser,
   j. means for conveying cooling water and condensate from said second condenser to said first condenser,
   k. first duct means for conveying said mixture from said cooler to said burner for incineration thereby,
   l. means for supplying additional combustion air to said burner, and m. means for maintaining the volume of said mixture collected no greater than the amount necessary to support combustion in said burner.

7. The apparatus of claim 6 wherein said maintaining means comprises:
a. second duct means providing said communication between said first condenser and said hood, and
b. fan means in said second duct means.

8. The apparatus of claim 6 wherein said maintaining means comprises:
a. second duct means providing said communication between said first condenser and said hood, and
b. damper means in said second duct means.

9. The apparatus of claim 7 wherein said maintaining means further comprises:
a. damper means in said second duct means.

10. The apparatus of claim 6 wherein:
a. said first duct means for conveying said mixture from said cooler to said burner includes first and second ducts, and
b. said means for supplying additional air to said burner includes:
i. an enlargement at a downstream end of said first duct, and
ii. an upstream end of said second duct being received in said enlargement in spaced relationship thereto.

11. Cooking apparatus comprising:
a. cooking means for cooking a food product,
b. a burner for heating said cooking means,
c. a collection hood overlying said cooking means and collecting a mixture of moisture and odor laden fumes emanating therefrom and ambient air entrained therewith,
d. a first condenser communicating with and receiving from said hood said mixture collected thereby,
e. a second water cooled condenser communicating with said first condenser and receiving said mixture therefrom,
f. a cooker communicating with said second condenser and receiving said mixture therefrom,
g. means for introducing cooling water to said cooler,
h. means for conveying cooling water from said cooler to said second condenser,
i. means for conveying cooling water and condensate from said second condenser to said first condenser,
j. first duct means for conveying said mixture from said cooler to said burner for incineration thereby,
k. means for supplying additional combustion air to said burner, and
l. means for maintaining the volume of said mixture collected no greater than the amount necessary to support combustion in said burner.

12. The apparatus of claim 11 wherein said maintaining means comprises:
a. second duct means providing said communication between said first condenser and said hood, and
b. fan means in said second duct means.

13. The apparatus of claim 11 wherein said maintaining means comprises:
a. second duct means providing said communication between said first condenser and said hood, and
b. damper means in said second duct means.

14. The apparatus of claim 12 wherein said maintaining means further comprises:
a. damper means in said second duct means.

15. The apparatus of claim 11 wherein:
a. said first duct means for conveying said mixture from said cooler to said burner includes first and second ducts, and
b. said means for supplying additional air to said burner includes:
i. an enlargement at a downstream end of said first duct, and
ii. an upstream end of said second duct being received in said enlargement in spaced relationship thereto.

16. The apparatus of claim 2 wherein said maintaining means comprises:
a. fan means in said directing means intermediate said collecting means and said combustion means.

17. The apparatus of claim 2 wherein said maintaining means comprises:
a. damper means in said direction means intermediate said collection means and said combustion means.

18. The apparatus of claim 16 wherein said maintaining means further comprises:
a. damper means in said directing means intermediate said collection means and said combustion means.

19. The apparatus of claim 3 wherein said means for supplying additional combustion air to said combustion means comprises:
a. first and second ducts comprising said directing means,
b. an enlargement on a downstream end of said first duct, and
c. an upstream end of said second duct being received in said enlargement in spaced relationship thereto.

* * * * *